Dec. 30, 1969         M. MASELLI         3,487,069
REFRACTOMETER WITH COMPENSATING PHOTOCELLS
Filed Dec. 20, 1965

INVENTOR
*MARIO MASELLI*

BY *Holcombe, Wetherill & Brisebois*
ATTORNEYS

United States Patent Office 3,487,069
Patented Dec. 30, 1969

3,487,069
REFRACTOMETER WITH COMPENSATING
PHOTOCELLS
Mario Maselli, Via G. Bruni 5, Parma, Italy
Filed Dec. 20, 1965, Ser. No. 515,127
Claims priority, application Italy, May 11, 1965,
10,522/65
Int. Cl. G01n 21/26
U.S. Cl. 250—218                                    4 Claims

ABSTRACT OF THE DISCLOSURE

A refractometer in which a light beam is reflected from a prism-liquid interface onto three groups of photocell means. One means is for measuring light at the angle of reflection and the other two means are for compensating for unwanted light which is reflected onto the first means. The other two means are connected in electrical opposition to the first means to provide compensation.

---

This invention relates to a refractometer of the type described in Italian Patent No. 587,956. Such a refractometer comprises a tube or vessel for receiving a fluid the refractive index of which is to be determined, a prism having a surface in contact with the fluid, means for projecting a beam of light through the prism into the fluid, photoelectric means for detecting the angle at which said light is reflected by the fluid, and an indicator for exhibiting the output of the photoelectric means.

It has, however, been found that when the fluid being tested is a turbid liquid with fine particles of foreign matter suspended therein, these particles individually reflect and consequently disperse the light reflected in such a way as to result in an inaccurate determination.

My improved refractometer comprises means for neutralizing the effect of this undesired dispersion, so that a more accurate indication results.

A preferred embodiment of my invention will now be described, purely by way of example, with reference to the accompanying drawings, in which.

Figure 1:
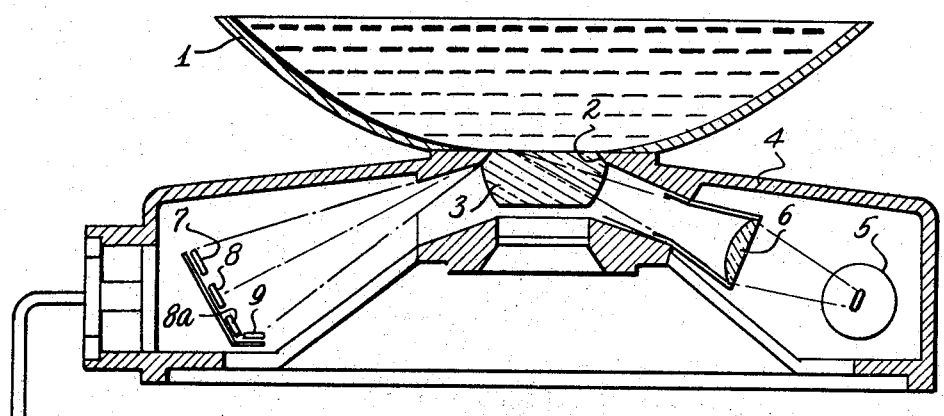
FIG. 1 is a schematic vertical section taken through the optical unit of my refractometer, with an indicator shown in plan attached thereto.

Referring now to FIGURE 1, it will be seen that the optical unit of the refractometer comprises a pipe or vessel 1 provided with an opening 2, which receives a prism 3, supported in a casing 4. Also supported in the casing 4 are a lamp 5 and a lens 6 for directing light from the lamp through the prism into the opening. On the opposite side of the casing from the lamp is a set of photoelectric cells 7, 8, 8a and 9. The cells are so positioned that if any light whatever is reflected by the liquid in the container at the interface between the prism and the liquid, this light will strike the cell 7. At the other extreme, cell 9 is so positioned that light from the lamp 5 reflected at the interface cannot reach it. The extent, if any to which light is received by the two intermediate cells 8, 8a, depends upon the refractive index of the liquid. Cell 9 is shown adjacent cell 8a, but may be positioned at any other point in the casing at which light reflected from the particles in the liquid can reach it, but the lamp beam reflected at the interface cannot.

Figure 2:
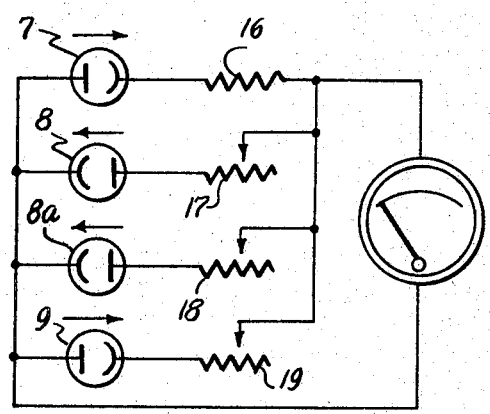
FIG. 2 is a circuit diagram showing one possible electrical circuit connected to supply to said indicator a current derived from the photoelectric cells in the optical unit.

Turning now to the circuit diagram of FIG. 2, it will be seen that the output of each of the cells is connected to a micro-ammeter 20 through one of the resistances 16, 17, 18 and 19. It will further be seen that resistors 17 and 18 and 19, through which cells 8, 8a and 9 are connected, are of the variable type, and may be adjusted to calibrate the instrument. Resistor 16 is heat sensitive, and acts to compensate for variations in the refractive index resulting from differences in the temperature of the various liquids being tested. If desired, this resistor may be mounted within the tank 1. Alternatively, it may simply be exposed to the ambient temperature and compensate for changes in that temperature only.

The arrows in FIG. 2 are used to indicate the polarity of the connections of the photocells, and it will be seen that the polarity of cells 7 and 9 is opposite to that of cells 8, 8a, so that the current produced by cells 7 and 9 opposes that produced by the cells 8, 8a. Cells 7, 8 and 8a may be found in the apparatus described in the prior patent, and the cell 7 serves as a reference cell so that the effect of the electrical circuit is to pass through the micro-ammeter a net current which indicates the difference between the amount of light received by reference photocell 7, which always receives light, and the amount received by cells 8, 8a, which are so positioned that the edge of the reflected beam of light falls upon one of them, thus yielding an indication of the position of the beam edge.

It has, however, been found that particles in suspension in the liquid tend to reflect light onto those portions of the photocells 8, 8a which are on the dark side of the edge of the beam reflected by the liquid. The result is that when such particles are present, current is produced by the photocells 8, 8a in response to the light reflected thereonto by the particles, thus introducing an error in the indication as to the index of refraction of the fluid itself.

The photocell 9, which is always beyond the edge of the beam, also receives light reflected by such particles, and since it is connected in opposition to cells 8, 8a, the current which it supplies compensates for that portion of the current supplied by the cells 8, 8a which derives from light reflected by the particles. A more accurate indication as to the index of refraction of the liquid itself results, and it becomes unnecessary to carefully remove all suspended matter therefrom before testing it.

Figure 3:
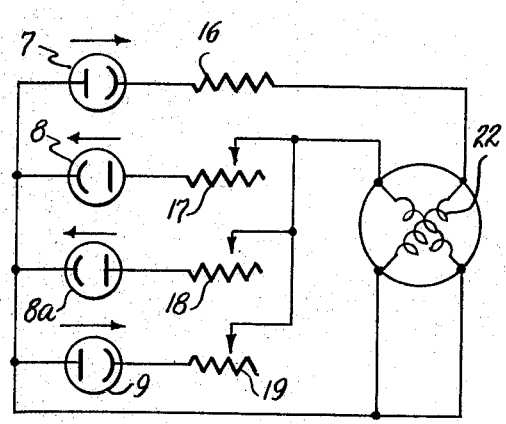
FIG. 3 is a circuit diagram showing an alternative electrical circuit for supplying current derived from the photoelectric cells to an indicator.

FIG. 3 shows an alternative arrangement for connecting the photocells to an indicator. In this embodiment the photocells are connected across a conventional device using crossed coils 22 which yields an output indicative of the ratio between the currents produced by cells 8, 8a on the one hand and cells 7, 9 on the other hand, instead of yielding an output representing the difference therebetween, as in the case of the FIG. 2 arrangement.

It will of course be appreciated that the embodiments described have been given purely by way of example and may be modified as to detail without thereby departing from the basic principles of the invention as defined by the following claims.

What is claimed is:

1. In a refractometer comprising a container, a prism in a wall of said container, means for directing a beam of light through said prism against the contents of said container, light sensitive means for generating an electrical current indicative of the angle at which said light beam is reflected at the interface between said contents and said prism and indicating means controlled by said current, the improvement according to which said light sensitive means comprises in combination first photoelectric means positioned to receive more or less light, depending upon the angle at which said beam is reflected at said interface, second photoelectric means positioned to receive light from said reflected beam regardless of the angle at which it is reflected from said interface, and third photoelectric means positioned to receive only such light as is reflected from within said contents to an area outside the area to which light from said beam can be reflected from said interface, said second and third photoelectric means being connected to supply to said indicator current of opposite polarity to that supplied by said first photoelectric means.

2. A refractometer as claimed in claim 1 in which said indicator is a micro-ammeter indicating the difference between the current produced by said first photoelectric means and the sum of that produced by said second and third photoelectric means.

3. A refractometer as claimed in claim 1 in which said indicator is connected to indicate the ratio between the current produced by said first photoelectric means and the sum of that produced by said second and third photoelectric means.

4. A refractometer as claimed in claim 1 in which said third photoelectric means is positioned adjacent said first photoelectric means on the opposite side thereof from said second photoelectric means.

References Cited

UNITED STATES PATENTS

| | | | |
|---|---|---|---|
| 2,294,377 | 9/1942 | Bierwirth | 250—210 |
| 3,183,349 | 5/1965 | Barnes et al. | 250—833 |

RALPH G. NILSON, Primary Examiner

MARTIN ABRAMSON, Assistant Examiner

U.S. Cl. X.R.

250—220; 356—135